Patented June 27, 1933

1,916,094

UNITED STATES PATENT OFFICE

LEO P. CURTIN, OF CRANBURY, NEW JERSEY, AND WILLIAM THORDARSON, OF NEW YORK, N. Y.; SAID THORDARSON ASSIGNOR TO SAID CURTIN

PROCESS OF MAKING BROMINE AND IODINE

No Drawing. Application filed October 19, 1931. Serial No. 569,842.

This invention relates to a process for the recovery of bromine and iodine from aqueous solutions of their salts and more particularly from dilute aqueous solutions thereof such as natural brines and sea water.

Bromine and iodine exist in sea water mainly in the form of metal bromides and iodides. The first step in the customary process of recovering this bromine and iodine is to liberate it in elemental form in any known or suitable way, e. g. by electrolysis or by treating the water with chlorine, preferably with a small addition of sulfuric acid to repress the formation of hypobromous acid and other undesired side reactions. Since this step of liberating the bromine and iodine in elemental form from their salts in dilute aqueous solutions is well known and has been fully discussed in published literature, it need not be described in detail here.

The next step in the process is to separate the liberated bromine and iodine from the water. Heretofore it has been proposed to recover the bromine by contacting the water with aniline whereby the bromine is absorbed by the aniline to the formation of tribromoaniline. This compound being insoluble in water is separated mechanically and the bromine recovered therefrom, e. g. by heat decomposition. Aniline is relatively expensive and absorbs the bromine only by a substitution reaction whereby only half of the bromine involved unites with the aniline to the formation of the tri-bromo compound and the other half forms hydrobromic acid which remains in the water. This process involving the use of aniline is not economical unless the market price of the bromine is fairly high. Moreover the iodine content of the water is not recovered. It has also been proposed to separate the liberated bromine and iodine from the water by the use of such solvents as carbon disulfide and carbon tetrachloride, but these solvents are both sufficiently soluble in water that losses thereof in the treatment of such dilute solutions as sea water would render the process uneconomical. Still another prior proposal is to contact the water containing liberated bromine with a pure saturated hydrocarbon and to recover the bromine therefrom by washing with dilute caustic soda. The saturated hydrocarbons react with bromine in such dilute solutions not at all by addition and only sparingly by substitution, and consequently the hydrocarbons function almost entirely as an inert solvent for the bromine.

The water of the gulf stream contains about 68 parts of bromine per million, ordinary sea water containing a little less, and the iodine content of sea water is reported by various investigators as ranging from 2 to 8 parts per million.

We have discovered that the liberated bromine and iodine content of such waters can be economically recovered by the use, in place of the above mentioned solvents, of a hydrocarbon liquid consisting essentially of non-aromatic unsaturated hydrocarbons. Such a hydrocarbon liquid is available at low cost in the form of so-called cracked gasoline. Vapor-phase cracked gasoline is preferred, but liquid-phase cracked gasoline serves practically as well. Although the entire liquid product constituting the cracked gasoline or any portion or fraction thereof may serve, we prefer to use the fraction boiling below 240° C. The hydrocarbon liquid should be as free as possible of sulfur compounds and other reducing agents such as organic peroxides which tend to reduce bromine and iodine, and therefore preferably is refined by treatment with a small amount of sulfuric acid, sodium plumbite, sodium hydroxide or other suitable agent adapted to remove sulfur and its compounds. Such a liquid unsaturated hydrocarbon mixture is relatively insoluble in water and is capable of absorbing the bromine and iodine content of the water quickly and practically completely. It is characteristic of distillates produced by the so-called cracking treatment of high-boiling petroleum fractions, such as gas oil, that they contain a quite high proportion of unsaturated hydrocarbons, such as olefines and di-olefines. These unsaturated hydrocarbons are very reactive chemically and moreover are practically insoluble in water. When such a hydrocarbon liquid is contacted with water, e. g. by agitation, containing free bromine and iodine, the latter react with the hydrocarbons forming addition compounds. The resulting halogenated hydrocarbons are insoluble in water, but have excellent solvent properties with respect to bromine and iodine. Thus the bromine and iodine in the water is taken up by the hydrocarbon both by chemical combination and by solution. In the case of iodine practically no substitution reaction with the hydrocarbon occurs and consequently no iodine is lost by the formation of hydroiodic acid. In the case of bromine a substitution reaction takes place to a certain extent, but this reaction may be offset and the loss of bromine reduced to a negligible amount by providing an excess of chlorine in the water under treatment so that any bromine released as hydrobromic acid by the substitution reaction is promptly oxidized by the excess chlorine thereby again liberating the bromine for absorption by and reaction with the hydrocarbon liquid. The hydrocarbon liquid is, of course, lighter than water, having a specific gravity of about 0.7, and therefore tends to float on top of the water, but it may be brominated and iodinated to such an extent and its specific gravity increased that it is heavier than the water and will sink to the bottom of the mixing chamber.

In a specific instance in accordance with our invention one part by weight of the fraction of vapor phase cracked gasoline boiling below 240° C. was agitated with 500 parts by weight of sea water in which the bromine and iodine content was released in the known manner by addition of an excess of chlorine. A suitable means for mixing the water and the hydrocarbon liquid is the so-called Thordarson emulsifier disclosed in U. S. Patent No. 1,683,500. The mixture was delivered into a settling tank from which the settled water was discharged to waste while the partially halogenated (brominated and iodinated) hydrocarbon liquid was returned and admixed with another quantity of chlorine-treated water; these operations being repeated until the desired degree of saturation of the hydrocarbon mixture with bromine and iodine was reached, whereupon the hydrocarbon liquid was withdrawn for treatment for the recovery of its bromine and iodine content and replaced by a fresh supply of hydrocarbon liquid. It will be understood that in practice many specific procedures and specific forms of apparatus may be devised for handling the hydrocarbon liquid and chlorinated water, these details forming no part of our present invention. For example, both the hydrocarbon liquid and the chlorinated water may be handled in continuous flow or on the countercurrent principle, and the separation of the mixed water and hydrocarbon liquid may be accomplished either by gravity settling or by means of a centrifugal device.

The optimum degree of saturation of the hydrocarbon with the bromide and iodine may readily be determined in any particular operation. The determining factors are the cost of the hydrocarbon liquid, the efficiency of absorption and the cost of the operation for recovering the bromine and iodine from the hydrocarbon liquid. Since the hydrocarbon liquid is relatively inexpensive and the absorption of bromine and iodine by it is very rapid and practically quantitative even as the point of saturation of the hydrocarbon with the bromine and iodine is approached and the bromine and iodine must be recovered from the hydrocarbon, e. g. by heat decomposition, it is generally desirable to carry the use of the hydrocarbon liquid to near the point of saturation thereof with bromine and iodine, or to the point at which the substitution reaction above referred to becomes troublesome.

As stated the hydrocarbon liquid carrying absorbed bromine and iodine is decomposed by heating it and the bromine and iodine recovered in concentrated form. The decomposition of the halogenated hydrocarbon and recovery of the halogen may be carried out substantially in the same manner as in the tribromoaniline process. This part of the process may be carried out substantially in the same manner as in the prior process above referred to, using aniline as the absorbent.

It is possible, and in many cases desirable, to increase the efficiency of the unsaturated hydrocarbon liquid by reinforcing it with unsaturated hydrocarbons or low molecular weight, for example, ethylene, propylene, the butylenes, the amylenes and acetylene. Most of these compounds exist in gaseous form at ordinary temperatures and pressures, but it is possible to dissolve large quantities of them in cracked gasoline. These unsaturated hydrocarbons of low molecular weight brominate readily and in some cases violently with formation of addition compounds, such as propylene dibromide in the olefine series, and in the case of acetylene, the dibromide or tetrabromide. The efficiency of such unsaturated hydrocarbons in recovering bromine is surprisingly high. For example, propylene dibromide, $C_3H_6Br_2$, contains 76% of bromine, and acetylene tetrabromide, $C_2H_2Br_4$, contains more than 90% of bromine.

These unsaturated hydrocarbons of low molecular weight and boiling point may be conveniently utilized where the operation is conducted in a closed vessel under a fairly high pressure. They may be used alone under sufficient pressure to keep them in liquid state, or together with unsaturated normally liquid hydrocarbons, or even with saturated hydrocarbons or other suitable solvent. The use of a closed vessel operated under pressure is frequently desirable even in the use of the normally liquid hydrocarbons to reduce loss by evaporation. In all cases their reaction with bromine gives an addition compound which is not particularly volatile, and which may be handled in open vessels. The bromination of ethylene to ethylene dibromide causes the boiling point to rise from $-104°$ C. to $+132°$ C.

Such unsaturated hydrocarbons are produced abundantly in connection with coal carbonization and in connection with the cracking of gas oil and other petroleum fractions. Acetylene may be manufactured in unlimited quantities from calcium carbide. While these low boiling unsaturated hydrocarbons are somewhat more expensive than ordinary cracked gasoline, their use is economically advantageous because of the remarkably high recovery of bromine which is made possible by their use. The yield of iodine is, of course, even higher because of its high molecular weight as compared with bromine.

Our invention therefore resides primarily in the use as the absorbing liquid in the recovery of bromine and/or iodine from their salts in dilute aqueous solutions of unsaturated hydrocarbon liquids in place of such previously proposed absorbents as aniline. By this substitution the cost of the absorbent is greatly reduced and the efficiency of the absorption is greatly increased whereby the economy of the process is greatly improved.

We claim:

1. Process for the recovery of a halogen of the group consisting of bromine and iodine which comprises liberating at least one of said halogens from a salt thereof in an aqueous solution containing the same, absorbing the liberated halogen from said aqueous solution in a liquid which comprises a non-aromatic unsaturated hydrocarbon and which is immiscible with said aqueous solution, and recovering the absorbed halogen from the liquid.

2. Process as defined in claim 1 in which the non-aromatic unsaturated hydrocarbon is normally a liquid.

3. Process as defined in claim 1 in which the liquid which comprises a non-aromatic unsaturated hydrocarbon is cracked gasoline.

4. Process as defined in claim 1 in which the liquid which comprises a non-aromatic unsaturated hydrocarbon is vapor phase cracked gasoline.

5. Process as defined in claim 1 in which the liquid which comprises a non-aromatic unsaturated hydrocarbon is a fraction of cracked gasoline boiling below $240°$ C.

6. Process as defined in claim 1 in which the non-aromatic unsaturated hydrocarbon is normally gaseous.

7. Process as defined in claim 1 in which the liquid comprises a normally gaseous non-aromatic unsaturated hydrocarbon and a normally liquid solvent therefor.

8. Process as defined in claim 1 in which the absorbing operation is carried out under superatmospheric pressure.

In testimony whereof, we affix our signatures.

LEO P. CURTIN.
WILLIAM THORDARSON.